`Patented Oct. 14, 1941`

UNITED STATES PATENT OFFICE 2,258,847

METHOD OF PREPARING METAL DITHIO-CARBAMATES

Howard I. Cramer, Cuyahoga Falls, Ohio

No Drawing. Application May 20, 1938,
Serial No. 209,142

21 Claims. (Cl. 260—429)

The present invention is directed to a practical and economical method for the production of metal dithiocarbamates derived from aryl-containing amines, and is of particular value in the preparation of mixed alkyl aryl amines, and in the narrower aspect of the invention, the secondary mixed alkyl aryl amines.

Broadly stated, the invention is directed to the production of metal dithiocarbamates, and particularly the heavy metal dithiocarbamates, by reacting an aryl-containing amine, and especially secondary aryl-containing amines including the alkyl aryl amines, with carbon disulphide, and a metal salt, said reaction being carried out in the presence of a solvent medium in which the reacting constituents and reaction by-products are soluble, and the desired metal dithiocarbamate insoluble.

It may be pointed out that a cheap and effective method has been available for a number of years for the preparation of metal dithiocarbamates derived from the aliphatic, aralkyl or alicyclic amines, said method involving the reaction of the amine, carbon disulphide, and an alkali hydroxide, such as a sodium hydroxide, in an aqueous method, in accordance with the following Equation 1 followed by precipitation of the metal dithiocarbamate by adding a solution of a metal salt, such as zinc chloride or sulphate, as set forth in Equation 2:

EQUATION 1

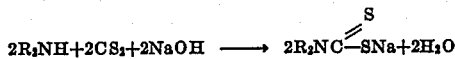

EQUATION 2

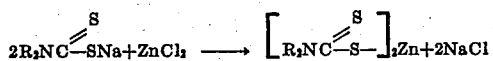

This simple and economical method gives exceedingly unsatisfactory results when applied to the heavy metal dithiocarbamates derived from aryl-containing amines, and particularly when the heavy metal dithiocarbamates are derived from the secondary mixed aryl alkyl amines. The formation of the sodium salt set forth in Equation 1 takes place very slowly, even though the reacting ingredients are thoroughly agitated. Further, side reactions occur, resulting in the formation of sodium thiocarbamates.

It has been proposed, in accordance with German Patent No. 523,034 granted April 30, 1931, to the I. G. Farbenindustrie Akt.-Ges. to substantially inhibit the production of side reactions by substituting an alkali carbonate for the alkali hydroxide, it being stated that satisfactory results were obtained when the above method was applied to aniline. However, when the method outlined in the German patent was applied to secondary aryl amines, which as a class are less basic than aniline, the major proportion of the amine, and more specifically, in some cases, as much as ninety-eight per cent (98%) of the amine remained unreacted, even after constant agitation with carbon disulphide and an aqueous solution of potassium carbonate for forty-eight (48) hours.

It has also been proposed to produce heavy metal dithiocarbamates by a method involving the metathesis between the zinc salts, such as zinc sulphate, and the ammonium salt of the aryl dithiocarbamic acid, both in aqueous solution, the ammonium salt being first isolated and then reacted with the metal salt. Metal dithiocarbamates may be produced as above set forth, by proceeding according to the general method of Losantisch (Ber. 24; 3021, 1891) and more specifically, the N-alkylated aryl amines may be reacted according to the method of Delepine (Bull. Soc. 3rd Series 27: 807, 1902). According to the method of Losantisch and Delepine, the amine is reacted with carbon disulphide and concentrated ammonium hydroxide in alcoholic solution. The complete synthesis involves the following steps:

EQUATION 3

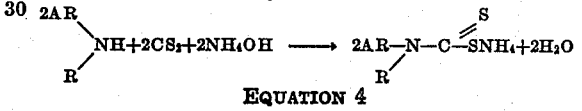

EQUATION 4

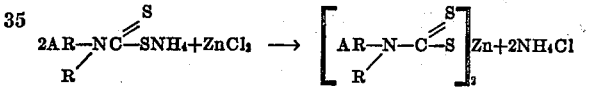

It has been found experimentally that this procedure is not applicable to the production of dithiocarbamates from the higher alkyl homologs of the amines, such as the N-cyclohexyl aniline, and further the method is not very economical as it involves two distinct operations. It is highly probable that the reason why the Losantisch method does not work to produce the dithiocarbamates from cyclohexyl derivatives of the amines, is that the reaction of the cyclohexyl aniline with ammonium hydroxide and carbon disulphide in alcohols is a slow one because of the low basicity of the amine. Further, the experimental results show that a larger proportion of by-products are formed using the Losantisch method than is obtained by the method of the present invention.

The object of the present invention is to provide a method for the synthesis of the heavy metal dithiocarbamates from the aryl-containing amines, and particularly from the alkyl aryl amines including all of the secondary N-alkyl aryl amines, said method reacting all of the materials necessary to produce the metal dithiocarbamates in one operation, to thereby provide a method which from the standpoint of economy, simplicity of operation, and formation of byproducts, compares favorably with the very efficient and simple method now in use for the production of heavy metal dithiocarbamates from the aliphatic amines, as above set forth.

The method of the present invention comprises the treatment of a solution of the amine together with a material capable of producing a

radical adapted to couple with the nitrogen atom of the amine in a suitable solvent together with a salt of a metal, such as a heavy metal, which it is desired to introduce into the dithiocarbamate, said solvent medium being one in which the reacting constituents and reaction byproducts are soluble, and the desired metal dithiocarbamate insoluble or of limited solubility, said solvent preferably being one which will exert a direct influence on the path of the reaction in such a fashion as to produce a low yield of by-product. The salt of the metal may be one derived from a weak acid, or, alternatively, a salt of a strong acid may be employed and the latter may be buffered with suitable buffer salts.

The reactions involved, in accordance with the method of the present invention, when using a salt of a weak acid are:

EQUATION 5

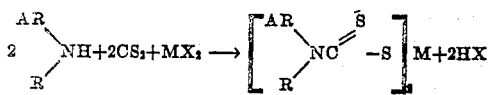

where
AR represents an aryl residue,
R may be H, an alkyl, aralkyl or an alicyclic group,
M may be zinc cadmium, lead, calcium, magnesium, cobalt, nickel, manganese, mercury, silver, arsenic, antimony, bismuth, tin, etc.; and
X may be any weak acid radical,
or alternatively when using a salt of a strong acid.

EQUATION 6

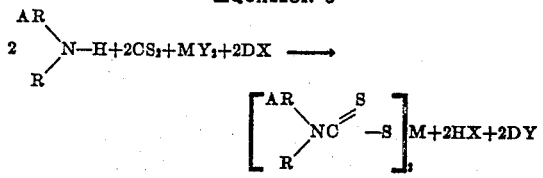

where Ar, R and M are representative of the same residues, groups, and metals as in Equation 5 and where Y may be any strong acid radical, and D is preferably an alkali metal, such as sodium, potassium, ammonium, or the like, although other equivalent materials may be used.

These reactions, as stated, are carried out in the presence of a solvent medium of the character herein set forth. The above methods of production are exemplified by the following illustrative examples, the first example (Equation 7) being applied to the reaction of N-ethyl aniline with zinc acetate to produce zinc phenyl ethyl dithiocarbamate, the zinc acetate being representative of a salt of a weak acid.

The method of production wherein a strong acid together with a buffer is employed is exemplified by the reaction set forth in the following Equation 8, where N-methyl aniline is reacted with carbon disulphide and zinc chloride in the presence of a buffer agent, such as sodium acetate, to produce zinc phenyl methyl dithiocarbamate:

EQUATION 7

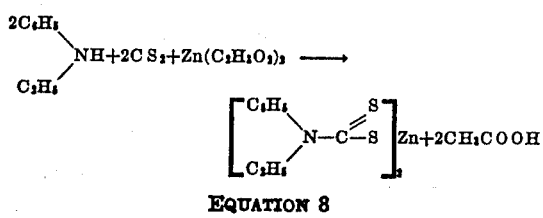

EQUATION 8

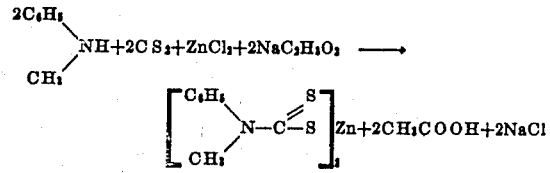

Any metal salt derived from a weak acid which functions to inhibit the formation of by-products is suitable for carrying out the present invention. Satisfactory results are obtained when using a salt of acetic acid, carbonic acid, boric acid, $HPO_4^=$ and $H_2PO_4^-$, hydrocyanic acid, sulphurous acid, formic acid, and in general any of the organic acids which are relatively weak acids, subject, however, to the limitation that any organic acid used should not interfere with the reactions proceeding in the direction called for by Equation 7.

Suitable satisfactory results have been obtained when a salt of a strong acid, such as zinc chloride has been used, and the acid has been buffered with buffer salts, such as sodium acetate, sodium bicarbonate, sodium borate and the like. It is recognized that metal salts having other acid radicals may be used, as for example, nitrate, sulphate, bromide, iodide and fluoride radicals.

While certain buffers have been set forth as suitable in carrying out the present invention, it is recognized that other buffer agents may be used, including any of the weak acid salts of all the metals in group I, family A of the periodic system and of the ammonium or substituted ammonium radicals.

Very satisfactory results have been obtained when the solvent medium comprised any liquid alcohol, as for example methyl, ethyl, isopropyl, butyl, amyl, hexyl, heptyl and octyl alcohols. The alicyclic alcohols may also be used, as for example cyclohexanol. In some instances, the solvent material contained an auxiliary solvent agent, as for example, pyridine, which was mixed with the alcohol, said auxiliary agent increasing the desirable characteristics of the composite solvent medium whereby the reacting materials and the by-products are essentially soluble in the composite solvent medium and the metal dithiocarbamate being produced essentially insoluble or of limited solubility. Instead of using the above alcohols, various benzyl alcohols and the like may be used, and, further, the hetero types of alcohols may be used, as for example, furfuryl and tetrahydro-furfuryl. The auxiliary solvent of the composite solvent medium, said auxiliary solvent functioning to increase the solubility of the initial reacting materials and the by-products of the reaction in the composite solvent and inhibiting the solubility of the finally produced dithiocarbamate in the composite solvent, may be the alpha, beta and gamma picolines, the various lutidines, the alkyl substituted pyridines in general, and the various quinolines. Those skilled in the art, after having been given the above range of equivalents of the auxiliary solvent, may adapt further auxiliary solvents for the purpose of carrying out the present invention.

The examples herein set forth of the auxiliary solvent are merely illustrative, and it is within the province of the present invention to use those equivalents known to those skilled in the art.

It may be pointed out that it is highly desirable that the metal dithiocarbamates produced in accordance with the present invention be essentially insoluble in the reaction solvent. However, some of the dithiocarbamates may be appreciably soluble in the auxiliary solvent, and as a result are slightly soluble in the composite solvent medium. This is particularly true in those cases where the dithiocarbamate forms an addition-compound with the co-solvent. For example, zinc cyclohexyl phenyl dithiocarbamate, when prepared as hereinafter described using a methanol-pyridine composite solvent mixture, is obtained as crystals containing one mol of pyridine of crystallization. This compound is appreciably soluble in pyridine but only slightly so in the composite mixture, and hence may be isolated in good yields therefrom.

Pyridine or any other heterocyclic tertiary amine is exemplatory of the co-solvent which functions in the preparation of dithiocarbamates of the character herein set forth as an reaction accelerator. In other words, the present invention broadly is directed to preparing the dithiocarbamates in the presence of a composite solvent medium in which the auxiliary solvent functions to make the reaction proceed at a faster rate than when the auxiliary solvent is absent, and simultaneously produces a product having a high state of purity. Pyridine is an example of such a reaction accelerator and those skilled in the art will be able to substitute for pyridine other agents of this character.

The addition-compound with pyridine belongs to the complex salts described by Werner as co-ordination compounds. These compounds are typical of many of the heavy metals, such as zinc, cadmium, cobalt and nickel. It is believed that the molecule of the amine is held to the salt molecule by means of residual valences possessed by the nitrogen atom of the amine and the metal atom of the salt.

In view of the above, the term "metal dithiocarbamates" is intended to include the addition-compounds of dithiocarbamates with the auxiliary solvent.

In order that the present invention may be clearly understood, the following illustrative examples are set forth.

THE PRODUCTION OF DITHIOCARBAMATES USING A WEAK ACID SALT OF THE METAL

*Preparation of zinc ethyl phenyl dithiocarbamate.*—To a solution of 121 grams (1 mol) of N-ethyl aniline and 80 grams (1 mol+5%) carbon disulphide in 650 ml. of 95% ethyl alcohol was added a solution of 110 grams (.5 mol) of zinc acetate dihydrate in 900 ml. of 60% ethyl alcohol, giving a completely miscible mixture. The reaction was allowed to proceed at room temperature. After twelve (12) hours the straw-colored crystalline product was filtered off, washed with 60% alcohol and dried. Yield—80.5%. On further standing, additional product crystallized from the mother liquors to bring the total yield to 95.8% or 219.5 grams. The product was of unusually high purity showing a melting point of 202-202.5° C.

The above reaction was carried out at room temperature. It was ascertained that the rate of the reaction might be safely increased by raising the temperature to 45-55° C.

The following Table A sets forth additional dithiocarbamates prepared by using that form of the invention in which a weak acid salt of the metal is used. The table also sets forth the yields obtained and the melting points of the respective dithiocarbamates:

Table A

| Dithiocarbamate | M. P. | Yield |
|---|---|---|
|  | Degrees | Per cent |
| Zinc n-amyl phenyl | 208-10 | 85 |
| Lead n-butyl phenyl | 138-9 | 87 |
| Lead sec-amyl phenyl | 63-5 | 90+ |
| Zinc hydrogen phenyl | 115-8 | 91 |

Instead of using a weak acid salt of the metal, such salt may be in situ formed by adding reacting materials to the amine, carbon disulphide and solvent medium. Specifically, it has been ascertained that instead of using zinc acetate, that a suspension of zinc oxide and acetic acid may be used. An illustrative example setting forth the production of dithiocarbamates in utilizing that modification of the invention wherein the weak acid salt of the metal is produced in situ, is as follows:

40.7 grams (.5 mol) of zinc oxide were suspended in a solution of 107 grams (1 mol) of N-methyl aniline, 80 grams (1 mol+5%) carbon disulphide, and 60 grams (1 mol) of acetic acid in 500 ml. of 75% ethyl alcohol. The mixture was refluxed for two (2) hours, whereby the zinc oxide slowly went into solution and a straw colored finely crystalline product formed. The mixture was allowed to cool and the product filtered with suction. The yield of zinc methyl phenyl dithiocarbamate, M. P. 249-50°, was 95.5%.

It is highly advantageous to form the weak acid salt of the metal in situ because of the economy involved. That is, when this modified method is used, the reacting weak acid may be used over and over again. An illustrative equation setting forth the use of the in situ formation of the weak acid salt of the metal is as follows:

EQUATION 9

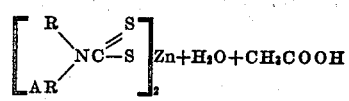

It will be understood from the above that the procedure outlined acts to put the zinc oxide into solution, as the acetate, and then allows the zinc component and acetate component to appear on the right hand side of the equation in the reaction products. It may be pointed out that it is desirable that the reaction between the metal compound and the weak acid be substantially complete, so that the finished product does not contain as a by-product any unreacted metal compound, as for example, zinc oxide. It is understood that in the above example and discussion, zinc oxide and acetic acid are merely illustrative of a metal compound and a weak acid compound which may be reacted in situ in the form of a suspension to produce the final weak acid salt of the metal.

The following is an example of that modification of the invention wherein a mixed composite solvent is used, and it may be stated that the use of pyridine as an auxiliary solvent along with an alcohol, as for example, methyl alcohol, is highly advantageous in the preparation of the metal dithiocarbamates from the cyclo aliphatic aryl salts, and especially N-cyclo-hexyl aryl salts. Zinc cyclohexyl phenyl dithiocarbamate may be prepared by allowing the following reaction mixture to stand at room temperature, for several days: N-cyclohexyl aniline, 175 grams (1 mol), carbon disulphide 80 grams (1 mol+5%), zinc acetate dihydrate 110 grams (.5 mol) dissolved in a mixture of 85 ml. of pyridine and 250 ml. of methyl alcohol. The zinc salt separates in good yield as well formed straw-colored crystals, melting at 308–10°, said product being a pyridine addition product.

It has been pointed out that instead of carrying out the present invention by using a weak acid salt of the metal, that strong acid salts may be used. It is more economical to use the strong acid salt, combined with a buffer, since this accomplishes the same result as when using a weak acid salt. For example, it is more economical to use a combination of zinc chloride together with a buffer, such as sodium acetate, sodium bicarbonate, sodium borate, and the like, than to use, for example, zinc acetate alone, or zinc formate, or zinc carbonate, or zinc borate, and the like. The following is a specific example illustrating that form of the present invention wherein a buffer salt is utilized.

Zinc butyl phenyl dithiocarbamate may be prepared by reacting N-butyl aniline, 149 grams (1 mol) with carbon di-sulphide, 80 grams (1 mol+5%), zinc chloride, 68 grams (.5 mol) and sodium acetate, 90 grams (1 mol+10%) in 600 ml. of 90% methyl alcohol. This mixture was refluxed for one hour. The zinc salt comes down as an oily product, which crystallizes on standing. The crystallized product after filtering and drying weighed 248 g. equivalent to a yield of 96.4%, melting point 199–200° C.

The acetic acid liberated may be recovered as sodium acetate by exact neutralization of the mother liquors with caustic soda and distilling off the alcohol.

The following Table B sets forth additional metal dithiocarbamates with their respective yields and melting points, said dithiocarbamates being obtained by the buffer salt method:

Table B

| Dithiocarbamate | M. P. | Yield |
|---|---|---|
| | °C. | Percent |
| Zinc methyl phenyl | 249–50 | 97 |
| Zinc n-propyl phenyl | 202–3 | 92 |
| Zinc prim-amyl phenyl | 208–10 | 86 |
| Zinc sec.-amyl phenyl | 130–32 | 90+ |
| Cadmium prim.-amyl phenyl | 189–90 | 74 |
| Mercury (ic) ethyl phenyl | 178–9 | 86 |
| Tin (stannous) ethyl phenyl | 114–5 | 70 |

Instead of using zinc chloride buffered with sodium acetate, a further example of a buffering solution is zinc sulphate heptahydrate and sodium acetate.

A further example of the use of buffer salts is the following: Zinc methyl phenyl dithiocarbamate was prepared in 97% yield using borax, $Na_2B_4O_7.10H_2O$ and zinc chloride, and in 84% yield using sodium bi-carbonate and zinc chloride. The reaction proceeds particularly smoothly in the latter case, evolving carbon dioxide according to the equation:

EQUATION 10

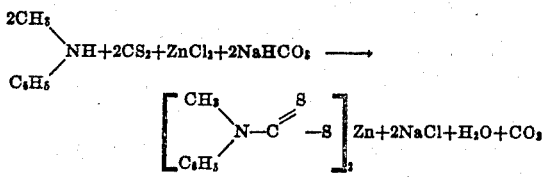

In Equations 5 and 6, the aryl amine has been represented by the formula

and it has been stated that R may be hydrogen, an alkyl, aralkyl or alicyclic group. The alkyl radical may be any radical, as for example, methyl, ethyl, propyl, butyl, amyl, etc. these radicals merely being illustrative. Likewise, the aralkyl radicals may be any radical, as for example, benzyl, beta-phenyl-ethyl, and the like. The invention is not restricted to any particular alkyl radical.

The alicyclic substituent group may be any alicyclic group, as for example, cyclohexyl, methyl cyclohexyl, or alicyclic tetrahydronaphthyl. The aryl constituent in the group AR or in the group R may be any aryl substituent and includes any aromatic-like or aryl-like substituent. Illustrative substituents are phenyl, tolyl, xylyl, alpha and beta naphthyl and such aromatic-like groups as pyridyl, furyl and quinolyl.

In the solvent medium herein disclosed, preferably the primary solvent is present in a predominating proportion and the secondary auxiliary or co-solvent is present in a minor proportion, although in some instances this may be reversed and the co-solvent be present in a predominating proportion and the primary solvent in a minor proportion. It is not desired to be restricted to any particular proportion of the auxiliary solvent in the composite solvent. Just how much of the co-solvent is used will depend upon the character of the initial reacting materials and the by-products of the reaction. As previously stated, in some cases the auxiliary or co-solvent may be a solvent at least to some extent of the finally produced metal dithiocarbamate. While the above gives the criterion for the amount of primary solvent or co-solvent present in the composite solvent, very satisfactory results have been produced when the auxiliary solvent is present in a percentage, as for example, from 5% to 35% of the amount of the primary solvent present.

It may be stated that the present invention is particularly applicable to the basic aryl-containing amines. In other words, the invention is most efficient and economical when the amine forming one of the reacting ingredients is at least feebly basic and by feebly basic is meant a compound typified by butyl and cyclohexyl anilines. It may be pointed out that the salt method of preparation, as set forth on page 1, is inoperative on certain dialkyl amines or operative only with the simultaneous formation of the metal hydroxide as a by-product because of the very extensive or complete hydrolysis which results from using strong acid salts of these metals in aqueous solution. For example, on attempting metathesis between sodium dibutyl dithiocarbamate and antimony chloride in aqueous medium, the main reaction is the hydrolysis of the metal salt to the basic insoluble antimony oxychloride, SbOCl. By applying the method herein set forth, i. e. by mixing together in alcohol solution the dibutyl amine, carbon disulphide, sodium acetate and the metal chloride, very good yields of the desired products were obtained with no hydrolysis or other by-product formation taking place. The following is a list of metal dithiocarbamates, showing the respective melting points and yields, said dithiocarbamates having been prepared by the method herein described:

*Table C*

| Dithiocarbamate | M. P. | Yield |
|---|---|---|
| | | Percent |
| Arsenic dibutyl | 125.5° C. | 83 |
| Antimony dibutyl | 77–8° C. | 86 |
| Bismuth dibutyl | 92.5° C. | 84 |
| Mercury (ic) dibutyl | 54° C. | 92 |
| Tin (stannous) dibutyl | Visc. oil | 92 |

The method herein set forth is applicable not only to the metal dithiocarbamates derived from the strictly aliphatic amines, as for example, the dialkyl amines, but also to the metal dithiocarbamates derived from the alkyl alicyclic amines.

It may be pointed out that in accordance with the present invention metal dithiocarbamates may be produced by reacting an amine containing an organic group, said amine being at least feebly basic, with a material capable of producing a

group adapted to couple with the nitrogen atom of the amine, and a metal salt, said reaction being carried out in the presence of a solvent medium in which the reaction constituents are soluble and the desired metal dithiocarbamates substantially insoluble, soluble to a limited extent or capable of forming an addition product with the metal dithiocarbamate without destroying the rapid or ultra acceleration properties of the metal dithiocarbamate. While the invention is particularly applicable to amines containing an organic group, said amines possessing a basicity of the order of that of aniline or less, as previously pointed out, the invention has given very satisfactory results utilizing amines which are at least feebly basic. The latter is, therefore, intended to include those amines which may be slightly more basic than aniline itself.

What is claimed is:

1. The method of preparing metal dithiocarbamates comprising reacting a secondary mixed alkyl aryl-containing amine with carbon disulphide and a metal salt of a weak acid, the metal component thereof being that of the desired dithiocarbamate, said reaction being carried out in a solvent medium in which the reacting constituents and the reaction by-products are soluble, and the desired metal dithiocarbamate insoluble.

2. The method of preparing metal dithiocarbamates comprising reacting a secondary mixed alkyl aryl-containing amine with carbon disulphide and a metal salt of a strong acid buffered with a buffer salt of a weak acid having a positive radical more positive than the positive radical of the salt of the strong acid, the metal of the metal salt of the strong acid being less basic than the metal of the buffer salt, said reaction being carried out in the presence of a solvent medium in which the reacting constituents and the reaction by-products are soluble and the desired metal dithiocarbamate insoluble.

3. The method of preparing metal dithiocarbamates having the formula

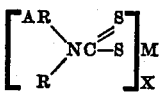

comprising reacting a secondary alkyl aryl-containing amine having the formula

with carbon disulphide and a metal salt of a weak acid, the metal component thereof being that of the desired dithiocarbamate, said reaction being carried out in a solvent medium in which the reacting constituents and the reaction by-products are soluble and the desired dithiocarbamate insoluble, AR in said formula representing any aryl group, R is a group selected from the alkyl, aralkyl and alicyclic groups, M is a metal, and X is an integer depending upon the valence of M.

4. The method of preparing metal dithiocarbamates having the formula

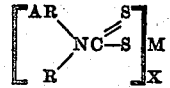

comprising reacting a secondary alkyl aryl-containing amine having the formula

with carbon disulphide and a metal salt of a strong acid buffered with a buffer salt of a weak acid having a positive radical more basic than the positive radical of the salt of the strong acid, the metal of the metal salt of the strong acid being less basic than the metal of the buffer salt, said reaction being carried out in a solvent medium in which the reacting constituents and the reaction by-products are soluble, and the desired dithiocarbamate insoluble, AR in said formula representing any aryl residue, R is a group selected from the alkyl, aralkyl and alicyclic groups, M is a metal, and X is an integer depending on the valence of M.

5. The method of preparing metal dithiocarbamates having the formula

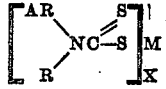

comprising reacting a secondary mixed alkyl aryl-containing amine having the formula

with carbon disulphide and a metal salt of a weak acid, the metal component thereof being that of the desired dithiocarbamate, said reaction being carried out in a composite solvent medium comprising a primary solvent and a secondary auxiliary solvent comprising a heterocyclic tertiary amine containing only carbon, nitrogen and hydrogen, said solvent medium functioning to increase the solubility of the initial reacting materials and the by-products of the reaction in the composite solvent medium, and to inhibit the solubility of the desired metal dithiocarbamate in the composite solvent, AR in said formula representing any aryl group, R is a group selected from the alkyl, aralkyl and alicyclic groups, M is a metal, and X is an integer depending on the valence of M.

6. The method of preparing metal dithiocarbamates having the formula

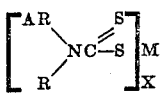

comprising reacting a secondary alkyl aryl-containing amine having the formula

with carbon disulphide and a metal salt of a strong acid buffered with a buffer salt of a weak acid having a positive radical more basic than the positive radical of the salt of the strong acid, the metal of the metal salt of the strong acid being less basic than the metal of the buffer salt, said reaction being carried out in a composite solvent medium comprising a primary solvent and a secondary auxiliary solvent comprising a heterocyclic tertiary amine containing only carbon, nitrogen and hydrogen, said solvent medium functioning to increase the solubility of the initial reacting materials and the by-products of the reaction in the solvent medium, and to inhibit the solubility of the desired metal dithiocarbamate in the composite solvent, AR in said formula being an aryl group, R is a group selected from the alkyl, aralkyl and alicyclic groups, M is a metal, and X is an integer depending upon the valence of M.

7. The method of preparing dithiocarbamates having the formula

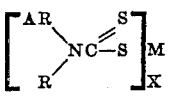

comprising reacting a secondary mixed alkyl aryl-containing amine having the formula

with carbon disulphide and a metal salt of a weak acid, the metal component thereof being that of the desired dithiocarbamate, said reaction being carried out in a composite solvent medium comprising a primary alcohol solvent and a secondary auxiliary solvent comprising a heterocyclic tertiary amine containing only carbon, nitrogen and hydrogen, said solvent medium functioning to increase the solubility of the initial reacting materials and the by-products of the reaction in the composite solvent medium and to inhibit the solubility of the desired dithiocarbamate in the composite solvent, AR in said formula being an aryl group, R is a group selected from the alkyl, aralkyl and alicyclic groups, M is a metal, and X is an integer depending on the valence of M.

8. The method of preparing metal dithiocarbamates having the formula

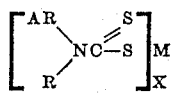

comprising reacting a secondary alkyl aryl-containing material having the formula

with carbon disulphide and a metal salt of a strong acid buffered with a buffer salt of a weak acid having a positive radical more basic than the positive radical of the salt of a strong acid, the metal of the metal salt of the strong acid being less basic than the metal of the buffer salt, said reaction being carried out in the presence of a composite solvent medium comprising a primary alcohol solvent and a secondary auxiliary solvent comprising a heterocyclic tertiary amine containing only carbon, nitrogen and hydrogen, said solvent medium functioning to increase the solubility of the initial reacting materials and the by-products of the reaction in the composite solvent medium and to inhibit the solubility of the desired metal dithiocarbamate in the composite solvent, AR in said formula being an aryl group, R is a group selected from the alkyl, aralkyl and alicyclic groups, M is a metal, and X is an integer depending on the valence of M.

9. The method of preparing dithiocarbamates having the formula

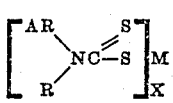

comprising reacting a secondary mixed alkyl aryl-containing amine having the formula

with carbon disulphide and a suspension of a weak acid and a metal compound adapted to in situ form a metal salt of a weak acid, the metal component thereof being that of the desired dithiocarbamate, the suspension components being present in quantities assuring substantially complete in situ reaction occurring therebetween, said reaction being carried out in a solvent medium in which the reacting constituents and the reaction products are soluble and the desired dithiocarbamate insoluble, AR in said formula being an aryl group, R is a group selected from the alkyl, aralkyl and alicyclic groups, M is a metal, and X is an integer depending on the valence of M.

10. The method of preparing dithiocarbamates having the formula

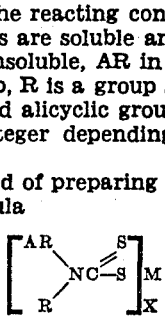

comprising reacting a secondary mixed alkyl aryl-containing amine having the formula

with carbon disulphide, and a suspension of a weak acid and a metal compound adapted to in situ form the metal salt of a weak acid, the suspension components being present in quantities assuring substantially complete in situ reaction occurring therebetween, the metal component of the salt of the weak acid being that of the desired dithiocarbamate, said reaction being carried out in a solvent medium in which the reacting constituents and the reaction products are soluble and the desired dithiocarbamate insoluble, AR in said formula being any aryl group, R is a group selected from the alkyl, aralkyl and alicyclic groups, M is a metal, and X is an integer depending on the valence of M, and recovering and reusing the weak acid generated during said steps.

11. The method of preparing metal dithiocarbamates comprising reacting an aryl-containing amine having the formula

where AR represents any aryl group and R is a group selected from the alkyl, aralkyl, and alicyclic groups; with carbon disulphide and a metal salt of a weak acid the metal component thereof being that of the desired dithiocarbamate, said reaction being carried out in a composite solvent medium, comprising a primary solvent and a secondary auxiliary solvent functioning to increase the solubility of the initial reacting materials and the by-products of the reaction in the composite solvent medium, and to inhibit the solubility of the desired metal dithiocarbamate in the composite solvent.

12. The method of preparing metal dithiocarbamates comprising reacting an aryl-containing amine having the formula

where AR represents any aryl group and R is a group selected from the alkyl, aralkyl, and alicyclic groups; with carbon disulphide and a metal salt of a weak acid, the metal component thereof being that of the desired dithiocarbamate, said reaction being carried out in a composite solvent medium, comprising a primary alcohol solvent and a pyridine auxiliary solvent functioning to increase the solubility of the initial reaction materials and the by-products of the reaction in the composite solvent medium, and to inhibit the solubility of the desired metal dithiocarbamate in the composite solvent.

13. The method of preparing metal dithiocarbamates comprising reacting a secondary mixed aryl-butyl-containing amine with carbon disulphide and a metal salt of a weak acid, the metal component thereof being that of the desired dithiocarbamate, said reaction being carried out in a solvent medium in which the reacting constituents and the reaction by-products are soluble, and the desired metal dithiocarbamate insoluble.

14. The method of preparing metal dithiocarbamates comprising reacting an aryl-containing cyclohexyl amine with carbon disulphide and a metal salt of a weak acid, the metal component thereof being that of the desired dithiocarbamate, said reaction being carried out in a solvent medium in which the reacting constituents and the reaction by-products are soluble, and the desired metal dithiocarbamate insoluble.

15. The method of preparing metal dithiocarbamates comprising reacting a secondary cycloaliphatic aryl-containing amine with carbon disulphide, and a metal salt of a weak acid, the metal component thereof being that of the desired dithiocarbamate, said reaction being carried out in a solvent medium in which the reacting constituents and the reaction products are soluble and the desired metal dithiocarbamate insoluble.

16. The method of preparing metal dithiocarbamates having the formula

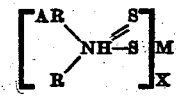

comprising reacting a secondary aryl-containing amine having the formula

with carbon disulphide and a suspension of components adapted to in situ form a metal salt of a weak acid, the metal radical thereof being that of the desired dithiocarbamate the suspension of the components being present in quantities assuring complete in situ reaction occurring therebetween, AR in said formula representing any aryl group, R being one of the alkyl, aralkyl and alicyclic groups, M is a metal, and X is an integer depending on the valence of M.

17. The method of preparing metal dithiocarbamates comprising reacting an aryl-containing amine having a basicity not greater than that of aniline and having the formula

with carbon disulphide, and a metal salt of a weak acid, the metal component thereof being that of the desired dithiocarbamate, said reaction being carried out in the presence of a solvent medium in which the reacting constituents and the reaction by-products are soluble, and the desired metal dithiocarbamate insoluble, AR in said formula representing any aryl group, and R being one of the alkyl, aralkyl and alicyclic groups.

18. The method of preparing dithiocarbamates comprising reacting an aryl-containing amine having a basicity not greater than that of aniline and having the formula

where AR represents any aryl group and R is a group selected from the alkyl, aralkyl and alicyclic groups; with carbon disulphide, and a metal salt of a weak acid, the metal component thereof being that of the desired dithiocarbamate, said reaction being carried out in a solvent medium in which the reacting constituents and the reaction by-products are soluble and the desired metal dithiocarbamate insoluble.

19. The method of preparing dithiocarbamates comprising reacting a secondary mixed alkyl aryl-containing amine having feeble basicity with carbon disulphide and a metal salt of a weak acid, the metal component thereof being that of the desired dithiocarbamate, said reaction being carried out in a solvent medium in which the reacting constituents and the reaction by-products are soluble and the desired metal dithiocarbamate insoluble.

20. The method of preparing metal dithiocarbamates comprising reacting an aryl-containing amine with carbon disulphide and a metal salt of a weak acid, the metal component thereof being that of the desired dithiocarbamate, said reaction being carried out in a solvent medium in which the reacting constituents and the reaction by-products are soluble, and the desired metal dithiocarbamate insoluble.

21. The method of preparing metal dithiocarbamates comprising reacting an aryl-containing amine with carbon disulphide and a metal salt of a strong acid buffered with a buffer salt of a weak acid having a positive radical more positive than the positive radical of the salt of the strong acid, the metal of the metal salt of the strong acid being less basic than the metal of the buffer salt, said reaction being carried out in the presence of a solvent medium in which the reacting constituents and the reaction by-products are soluble and the desired metal dithiocarbamate insoluble.

HOWARD I. CRAMER.